G. SCHLIEBS.
METHOD AND APPARATUS FOR PRODUCING SULFURIC ACID.
APPLICATION FILED MAY 22, 1914.
1,151,294.
Patented Aug. 24, 1915.
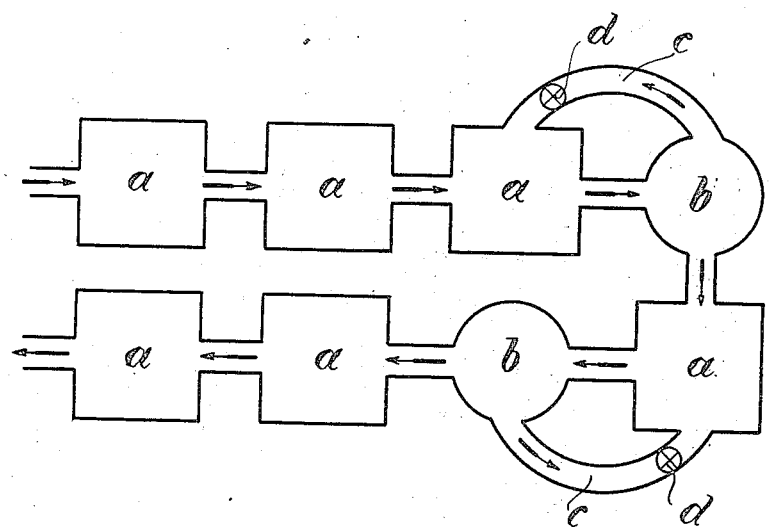
Witnesses
John C. Sanders
Albert F. Houman
Inventor
Georg Schliebs
By M. Mulan White
ATT'Y

UNITED STATES PATENT OFFICE.

GEORG SCHLIEBS, OF COLOGNE, GERMANY.

METHOD AND APPARATUS FOR PRODUCING SULFURIC ACID.

1,151,294. Specification of Letters Patent. Patented Aug. 24, 1915.

Application filed May 22, 1914. Serial No. 840,183.

*To all whom it may concern:*

Be it known that I, GEORG SCHLIEBS, a subject of the German Emperor, residing at Cologne-on-the-Rhine, Germany, have invented new and useful Improvements in Methods and Apparatus for Producing Sulfuric Acid, of which the following is a specification.

It has been found that with the known forms of tower for the manufacture of sulfuric acid, difficulties are often experienced in operation, owing to the fact that the process for the production of the sulfuric acid is not completed at the proper time in the towers acting as acid producers and moreover, completely formed acid is only incompletely separated. These difficulties may be the result of relatively small faults of various kinds; they always entail a disturbance of the working of the end towers acting as Gay Lussac towers, so that an increased consumption of saltpeter is caused. Such disturbances or interruptions are much more serious in the tower systems than in the chamber system, because the large chamber area serving for compensation does not exist in the tower system. Accordingly if it be desired in the tower system to render the fluctuations as little injurious as possible, the system must be capable of modification to a certain degree as is the chamber system.

In accordance with the present invention this adapatability is obtained by arranging after each tower or groups of towers a special compensator. This compensator may consist of an acid separator of any suitable kind such as is usually employed in the manufacture of sulfuric acid as acid producing, separating and cooling apparatus, for example a tower-like apparatus with or without a filling, lead chambers of suitable form with or without accessory apparatus, gas filters, tubular or flat coolers and so forth or a suitable combination of such apparatus. This compensator acts in such a manner that in normal operation it is merely interposed in the ordinary path of the vapors and serves as acid separator in the same way as the other towers and the like. If irregularities of working occur, however, the compensator can be operated in such a manner that by means of a special circulation conduit, it allows the vapors to return to the towers in the cycle of operations, so that the vapors pass through the towers and the compensator as often as may be necessary and in this manner the production of acid in the several towers can be regulated. This operation of the compensator can be obtained by means of a draft producer of any suitable or desired type inserted in the said circulation conduit and which, when started, causes the circulation of the vapors for a period of time that can be regulated as desired and at an adjustable rate of flow of the gases, by suitable means, not shown.

A constructional form of the novel system of tower with compensator is diagrammatically illustrated in the accompanying drawing.

The towers $a$ are connected in series in the known manner. After a number of these towers (in the present case after two towers $a$ for example) a special acid separator $b$ is arranged as compensator. In addition to the normal path of the gas this compensator is connected with the preceding corresponding tower by a special circulation conduit $c$ in which a draft producer $d$ of any suitable kind is arranged.

In normal operation, the compensators $b$ and the towers $a$ are inserted in the normal path of the vapor, that is to say, the gases pass once through the compensators $b$ and through the towers, and the like. Normally therefore the compensators serve as acid producers and separators and if desired also as gas coolers of given capacity.

Now let it be assumed that owing to faults of any kind the operation of the towers is rendered irregular, so that for example, some part of the process is displaced from the first towers to the middle towers thereby overloading them. The draft producer $d$ of the corresponding compensator of compensators $b$ is started and the vapors then do not merely follow the normal path, but also follow a circuit from the separator through the circulation conduit to the towers and back to the separator. On this circuit, owing to the greater use made of the towers and the increased friction and cooling effect, the separation and formation of the acid is increased to a multiple of the normal amount produced. In this way the overloading of the towers is rendered harmless and transmission of the irregularities of working to the rear towers and the resulting irregularity of working of the entire process, is avoided.

As the draft producer can be started instantly so that the action of the compensator and of the gas circulation is produced in a few minutes, regulating means of the highest efficacy are provided. It will of course be understood that the compensator may also serve merely as a gas production and cooling apparatus.

Claims:

1. A method for producing sulfuric acid by passing the acid vapors or gases through a series of towers to a separator, and from said separator to another series of towers and thence to another separator, and by returning a portion of an over-load of uncondensed vapors and gases back from each of said separators to the preceding series of towers, so that each series of towers and each separator may properly condense its portion of vapors and gases.

2. An apparatus for producing sulfuric acid comprising a series of towers, a separator succeeding the series of towers, in position, a conduit connecting said towers in series with the separator, and a second conduit connecting said separator and the preceding series of towers whereby a portion of an over-load of vapor to the condenser may return to said towers.

3. An apparatus for producing sulfuric acid comprising a series of towers, a separator succeeding the series of towers in position, a conduit connecting said towers in series with the separator, a second conduit connecting said separator and the preceding series of towers, and a draft producer in said second conduit adapted to convey a portion of an over-load of gases and vapor from the separator back to the preceding series of towers, substantially as described.

4. An apparatus for producing sulfuric acid comprising a multiplicity of series of towers, a separator interposed between each series of towers, a conduit connecting the separator in series with all of the towers, a second conduit connecting each separator with the preceding series of towers, and a draft producer in each conduit for conveying a portion of an over-load of gases from the separator back to the preceding series of towers, substantially as described.

In testimony whereof I have signed my name to this specification in the presence of two subscribing witnesses.

GEORG SCHLIEBS.

Witnesses:
PHILIPP LÖWENTHAL,
LOUIS VANDORY.